(12) United States Patent
Kutschera

(10) Patent No.: US 9,096,237 B2
(45) Date of Patent: Aug. 4, 2015

(54) FREIGHT CAR

(71) Applicant: Wilhelm Kutschera, Villach (AT)

(72) Inventor: Wilhelm Kutschera, Villach (AT)

(*) Notice: Subject to any disclaimer, the term of this patent is extended or adjusted under 35 U.S.C. 154(b) by 91 days.

(21) Appl. No.: 13/940,756

(22) Filed: Jul. 12, 2013

(65) Prior Publication Data

US 2014/0013995 A1    Jan. 16, 2014

(30) Foreign Application Priority Data

Jul. 12, 2012 (AT) .................................. A 778/2012

(51) Int. Cl.
| | | |
|---|---|---|
| *B61D 3/00* | (2006.01) | |
| *B60P 3/035* | (2006.01) | |
| *B61D 3/08* | (2006.01) | |
| *B61D 3/16* | (2006.01) | |
| *B61D 45/00* | (2006.01) | |

(52) U.S. Cl.
CPC ................. *B61D 3/005* (2013.01); *B60P 3/035* (2013.01); *B61D 3/00* (2013.01); *B61D 3/08* (2013.01); *B61D 3/16* (2013.01); *B61D 45/003* (2013.01)

(58) Field of Classification Search
CPC .............. B61D 3/16; B61D 3/00; B61D 3/08; B61D 3/005; B61D 3/14; B61D 45/003; B60P 7/0892; B60P 7/12; B60P 7/08; B60P 7/06; B60P 3/035
USPC ........................... 105/355, 418, 404, 415, 378
See application file for complete search history.

(56) References Cited

U.S. PATENT DOCUMENTS

| | | | | |
|---|---|---|---|---|
| 3,291,072 | A * | 12/1966 | Cunningham | 410/49 |
| 3,353,506 | A * | 11/1967 | Snyder et al. | 410/49 |
| 3,376,062 | A * | 4/1968 | Chosy et al. | 410/49 |
| 3,460,684 | A * | 8/1969 | Almasy | 410/49 |
| 3,665,869 | A * | 5/1972 | Howe | 108/53.1 |
| 3,922,004 | A * | 11/1975 | Chamberlain | 410/49 |
| 4,474,359 | A * | 10/1984 | Weaver | 254/8 C |
| 4,686,907 | A * | 8/1987 | Woollam et al. | 105/4.1 |
| 5,170,717 | A * | 12/1992 | Richmond et al. | 105/377.09 |
| 5,191,842 | A * | 3/1993 | Tinkler | 105/355 |
| 5,622,116 | A * | 4/1997 | Carlton | 105/355 |
| 6,363,864 | B1 * | 4/2002 | Jamrozy et al. | 105/418 |
| 6,579,048 | B2 * | 6/2003 | Al-Kaabi et al. | 410/49 |
| 6,619,213 | B2 * | 9/2003 | Militaru et al. | 105/404 |
| 6,749,381 | B2 * | 6/2004 | Coslovi et al. | 410/49 |

(Continued)

FOREIGN PATENT DOCUMENTS

| | | |
|---|---|---|
| DE | 195 16 561 A1 | 12/1995 |
| DE | 10312638 A1 | 10/2004 |

(Continued)

*Primary Examiner* — Jason C Smith
(74) *Attorney, Agent, or Firm* — Laurence A. Greenberg; Werner H. Stemer; Ralph E. Locher

(57) ABSTRACT

A freight car has a loading area on two bogies. At least one coil trough for steel coils is formed in the loading area. The coil trough is formed with insertion openings for insertion stakes. Wedges which are provided alongside the coil trough can be folded down into the loading area so that the coil troughs are closed by folding down the wedges to form a level loading area. Slots for stakes to be inserted along the longitudinal sides of the freight car are further provided in the loading area. Container corners are further provided distributed over the loading area, so that containers can be secured to the loading area. Retractable lashing devices are provided in the loading area for tightening tensioning straps to secure a load on the loading area.

17 Claims, 10 Drawing Sheets

(56) References Cited

U.S. PATENT DOCUMENTS

| | | | |
|---|---|---|---|
| 7,306,415 B2 * | 12/2007 | Halliar | 410/77 |
| 7,815,404 B2 * | 10/2010 | DeMent | 410/49 |
| 7,972,098 B2 * | 7/2011 | DeMent | 410/49 |
| 8,672,594 B1 * | 3/2014 | West | 410/35 |
| 2002/0073884 A1 * | 6/2002 | Al-Kaabi et al. | 105/355 |
| 2011/0248141 A1 * | 10/2011 | Lee | 248/346.5 |
| 2014/0013995 A1 * | 1/2014 | Kutschera | 105/378 |

FOREIGN PATENT DOCUMENTS

| | | |
|---|---|---|
| GB | 1266689 A | 3/1972 |
| GB | 2 289 876 A | 12/1995 |

* cited by examiner

FREIGHT CAR

BACKGROUND OF THE INVENTION

Field of the Invention

The invention relates to a freight car, in particular a freight car for the railroad, with a loading area and at least two axles, particularly four axles, mounted on two bogies.

Different types of freight car are currently known in the art. For example, there are container cars, cars for transporting coils (shim cars), stake cars and sliding wall cars, etc.

One problem affecting known freight cars is that they cannot be used at any time, but only when they are to be used to transport freight for which they are set up.

Known freight cars of the kind referred to above are also problematic, insofar as return journeys usually have to be undertaken empty when there is no matching return freight.

A convertible freight space structure for roll-shaped loads such as steel coils is known from DE 195 16 561 A. The known freight space structure is mounted on the loading area of a freight car, without the loading area itself being changed. The known freight space structure is a unit that can be removed from the body of the freight car. The freight space structure disclosed in DE 195 16 561 A exhibits trough sections, in which coils can be held. The trough sections are formed by wedge-shaped parts, which can be pivoted in different directions. In this way, the wedge-shaped parts of the trough sections can be pivoted from their trough-sections-forming position about horizontal axes, in order to create a level floor configuration. The parts of the trough sections may also be folded up into a perpendicular position relative to the floor of the freight space structure, in order to form a side wall.

The disadvantage of the freight space structure disclosed in DE 195 16 561 A is that it has to be mounted on freight cars and thereby reduces the freight car's available payload due to its weight.

BRIEF SUMMARY OF THE INVENTION

The problem addressed by the invention is that of supplying a freight car of the kind referred to above, which can be set up to transport different freight, according to need.

The problem is solved according to the invention by a freight car which exhibits the features as claimed.

Preferred and advantageous embodiments of the freight car according to the invention are the subject-matter of the dependent claims.

The embodiment of the freight car according to the invention enables it to be adapted in line with the nature of the freight being transported by equipping it according to the freight. It is possible in this case for the freight car according to the invention to be equipped to transport different freight. This makes a reduction in the types of car possible, so that different kinds of freight car, particularly the four different kinds referred to above, are no longer needed.

It is advantageous in the case of the freight car according to the invention for said freight car to have a level loading area, which can be utilized in a multiplicity of ways.

Unlike in the case of the freight space structure disclosed in DE 195 16 561 A, no separate structural member distinct from the freight car, in which structural member mechanisms are provided for receiving coils, is placed on a freight car. Instead, the structural members which allow the multiple configuration of the freight car adapted to the use of said freight car in each case are directly attached to the freight car or can at least be directly attached to the freight car, if they are not provided on the freight car.

The amount of matching return freight is significantly increased by the configuration of the freight car according to the invention, resulting in greater overall utilization of the freight car.

For example, the freight car according to the invention is designed as a covered sliding wall car. The cover may be movable, so that the loading area in the region where there is no cover is accessible for loading and unloading the freight car.

The cover of the cover sliding wall car may be watertight. The cover may be a customary tarpaulin cover (coated fabric) or a metal cover.

In one embodiment, the freight car according to the invention may be equipped with coil troughs (holding troughs) for the transportation of coils (steel coils). In particular, four coil troughs are provided for the transportation of steel coils, for example. It can be provided in this case that a plurality of stake pockets, e.g. five, which can receive (strong) insertion stakes in order to secure the positive engagement and correct load distribution of the steel coil, are provided in the coil troughs.

If the insertion stakes, which may have the dimensions 80×80×1500 mm, are not required, they are stored in the coil trough (coil recess, receiving trough) and the coil trough is closed off using a trough cover.

Covering the coil troughs produces an uninterrupted loading area for the freight car according to the invention.

In one embodiment, the cover of the coil troughs can easily be handled and is so strong that it can also easily be driven over by stacker axle loads of up to 5,500 kg.

Depending on what is required, the coil troughs may be aligned in a longitudinal direction and/or a transverse direction of the freight car, particularly the loading area thereof.

In a further embodiment of the invention, container corners are provided in the freight car according to the invention. For example, sixteen container corners are provided, particularly in the floor of the loading area, so that 3×20 feet, 1×40+20 foot or 2×30 feet containers can be transported in the freight car according to the invention, particularly under the sliding cover.

In one embodiment, the freight car according to the invention is configured with stakes, wherein particularly eight pairs of stakes are provided, which can be anchored in the freight car, particularly along the edges of the loading area, in different positions. For this purpose, in a preferred embodiment insertion openings (slots, stake pockets) are located in the car floor (loading area), wherein it is provided that a plurality of groups of insertion openings is provided, so that the spacing of the stakes relative to one another can be taken into account on the width of the goods being transported and that the stakes are inserted in the stake pockets in different positions of the loading area. For example, widths of 2.70 m to 2.30 m are possible.

In particular, it is provided within the framework of the invention that the stakes can have a height of 2.20 m.

It is provided in one embodiment that eight pairs of stakes are provided, which divide the loading area of the freight car into nine equally sized zones.

It is provided in one embodiment that the stakes are accommodated in a stake store when not in use, which store may be located on the freight car (e.g. beneath the loading area) or at the front in the freight car.

It is provided in one embodiment that the stakes may have battens, particularly made of wood or metal (aluminum), as holding devices for load securing. For example, three or four such battens are provided above one another.

For load securing, lashing devices (e.g. lashing lugs) are inserted in the floor of the freight car (loading area) in one embodiment. For example, ten pairs of lashing devices are provided.

In addition, in one embodiment the car according to the invention has a plurality of load restraints, particularly eight, which are inserted in the floor and can be folded down into a projecting position (position of use) over the top side of the loading area. Goods, e.g. sawn timber, can be transported spaced apart from the upper side of the loading area on load restraints folded down into the position of use.

Battens made of wood or metal (aluminum) which can be attached to stakes at the sides may be replaced by other load-securing systems, so that various load-securing possibilities by means of insertion battens at the front and back are possible.

One embodiment of the invention provides that cross-pieces are provided, which can be suspended on longitudinal battens, which are attached to the stakes. These cross-pieces facilitate a double-deck design, so that additional pallets can be transported on a second level.

As mentioned, the basic structure of the freight car according to the invention, particularly a cover sliding wall car, is such that goods can be protected from outside influences by covers during transportation.

Advantages of the freight car according to the invention can be described as follows according to the embodiment:

The plurality of properties (following a simple changeover) means that numerous combinations of freight transport are possible, which means that the idle share of the freight car can be reduced to a minimum. It is therefore possible to transport freight on the return trip, which would not have been a matching return in the case of traditional freight cars.

The embodiment of the freight car according to the invention allows it to transport different goods on the outgoing and return journey. It is therefore possible, for example, to transport sawn timber on one journey and steel coils on the return journey.

It is also possible for different freight to be transported simultaneously with the freight car according to the invention. For example, pallet goods with a length of 5 loading meters, sawn timber with a length of 4 meters and a 20-foot container can be transported simultaneously. It is also possible, for example, for two coils and pallet goods to be transported simultaneously, wherein, however, every other combination of different functions is also possible.

In a possible embodiment of the invention, the superstructures of the freight car can be removed and stacked in the unladen state. The great advantage, therefore, is the ability to react to seasonal fluctuations at any time and prevent special freight cars from repeatedly standing unused, which has a negative impact on the vehicle's profitability. This enormous advantage balances out any non-standard car lengths and also far outweighs the generally higher procurement and leasing costs, on account of the permanently greater productivity. In this way, the invention makes a substantial contribution to effectively reducing the number of freight cars needed for the most varied cargoes.

The versatility of the freight car according to the invention means that it is also of interest to haulers, as it is now possible for their freight to be transported cost-effectively by rail (railway), so that the road haulage customary today can be avoided or at least reduced.

In a preferred embodiment of the invention, it may be provided that coil troughs are arranged in pairs to accommodate steel coils.

In a preferred embodiment of the invention, it may be provided that the container corners are designed in a retractable manner in the floor of the loading area.

In a preferred embodiment of the invention, it may be provided that a total of sixteen container corners for 3×20 feet, 1×40+20 feet or 20×30 feet containers are provided overall.

In a preferred embodiment of the invention, it may be provided that a plurality of insertion openings for stakes is provided in rows which are aligned transversely to the longitudinal extension of the loading area.

In a preferred embodiment of the invention, it may be provided that receiving spaces for unwanted stakes are provided below the loading area.

In a preferred embodiment of the invention, it may be provided that the rows of insertion openings for stakes each have six insertion openings.

Further details and features and also advantages of the invention result from the following description of preferred exemplary embodiments with the help of the drawings.

DESCRIPTION OF THE INVENTION

Figure 1:
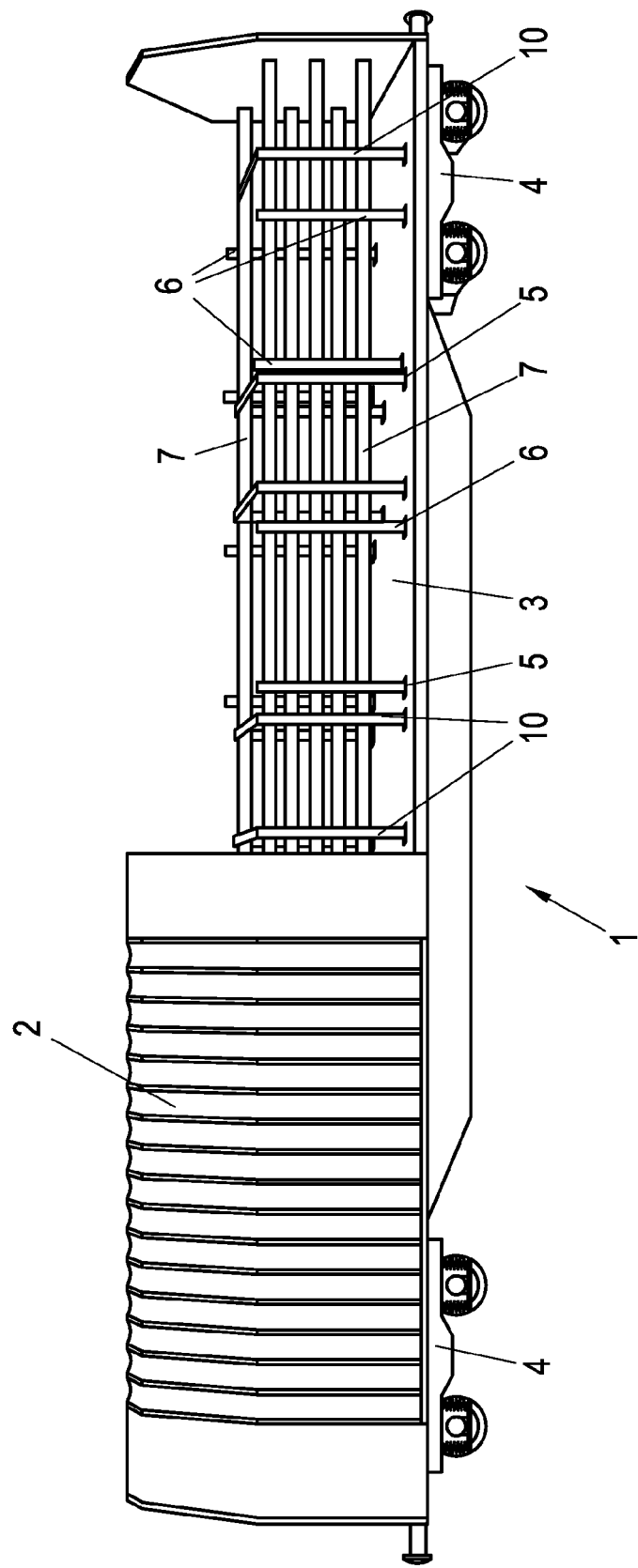
FIG. 1 shows a freight car designed according to the invention in the form of a covered car.

A freight car 1 shown in FIG. 1 is designed as a covered sliding wall wagon and depicted in FIG. 1 with the covers 2, which are movable along the loading area 3 along the freight car 1, in the open position.

The freight car 1 is configured in the example as a four-axle freight car 1 with two bogies 4 at both ends. This is only one example of the chassis of the freight car 1 according to the invention, as this can also be designed as a twin-axle or triple-axle car.

In the exemplary embodiment shown in FIG. 1, stakes 6 are provided in the loading area 3 in slots 5 designed as stake pockets, said stakes being arranged in pairs and inserted in selected slots 5 in the loading area 3. In the exemplary embodiment shown, eight pairs of stakes 6 are provided, which divide the loading area 3 of the freight car 1 into nine identical zones. In the exemplary embodiment shown, a plurality of battens 7 are provided on the stakes 6 for load securing. The battens 7 are aligned horizontally, in other words parallel to the loading area 3 of the freight car 1.

The slots 5 are combined into a plurality of groups each made up of several stake pockets 5 each, distributed over the length of the freight car 1, extending transversely to the loading area 3. In this way, the spacing of each pair of stakes 6 can be adapted to the width of the cargo.

Figure 2:
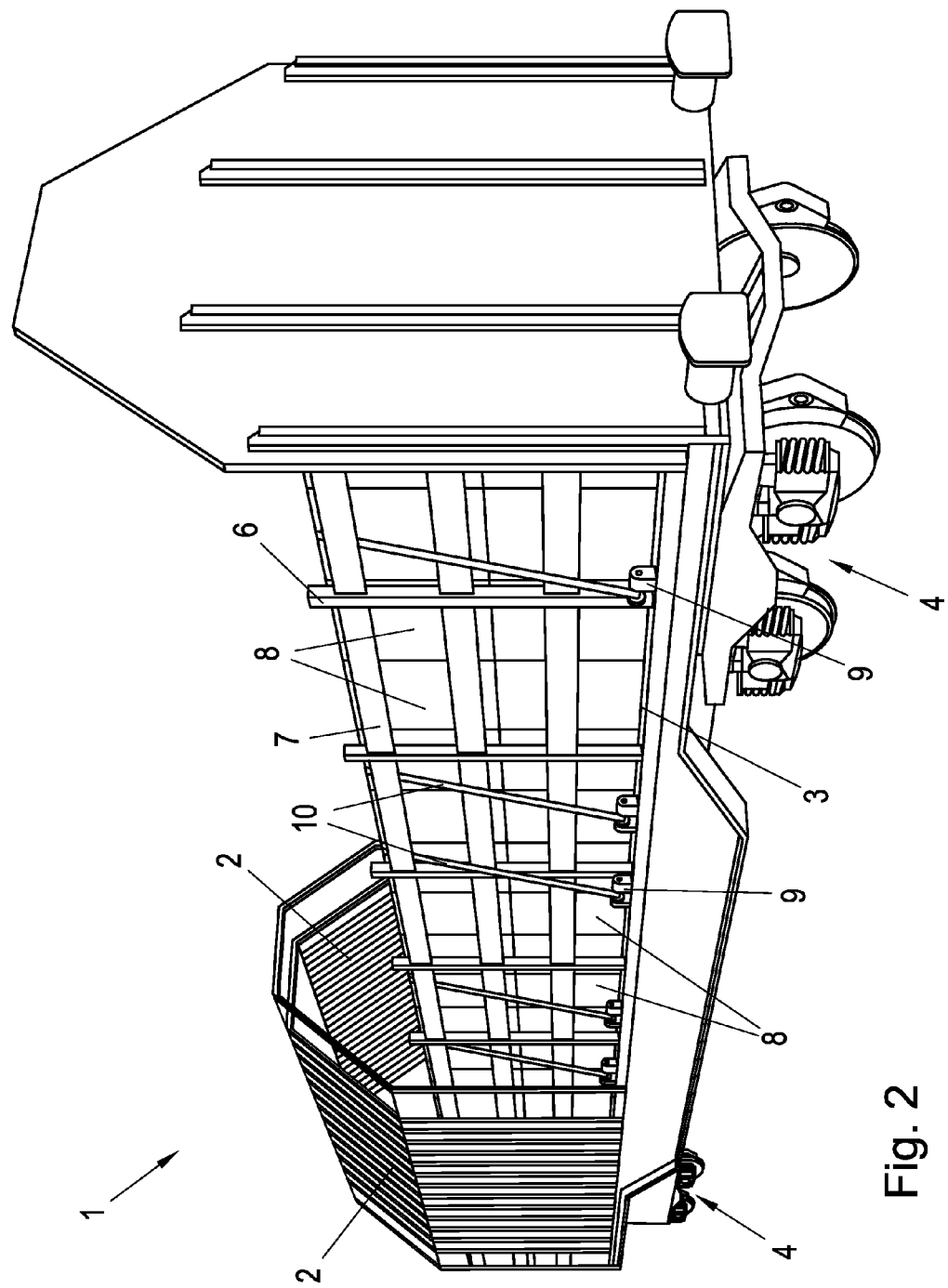
FIG. 2 shows the freight car from FIG. 1 laden with pallets.

FIG. 2 shows a freight car 1 according to the invention, which is laden with pallets 8. FIG. 2 also shows that lashing devices 9 are provided on the loading area 3, with which tensioning belts 10 can be tightened, in order to secure the load in addition to the stakes 6 and the load securing means in the form of battens 7/strips.

Figure 3:
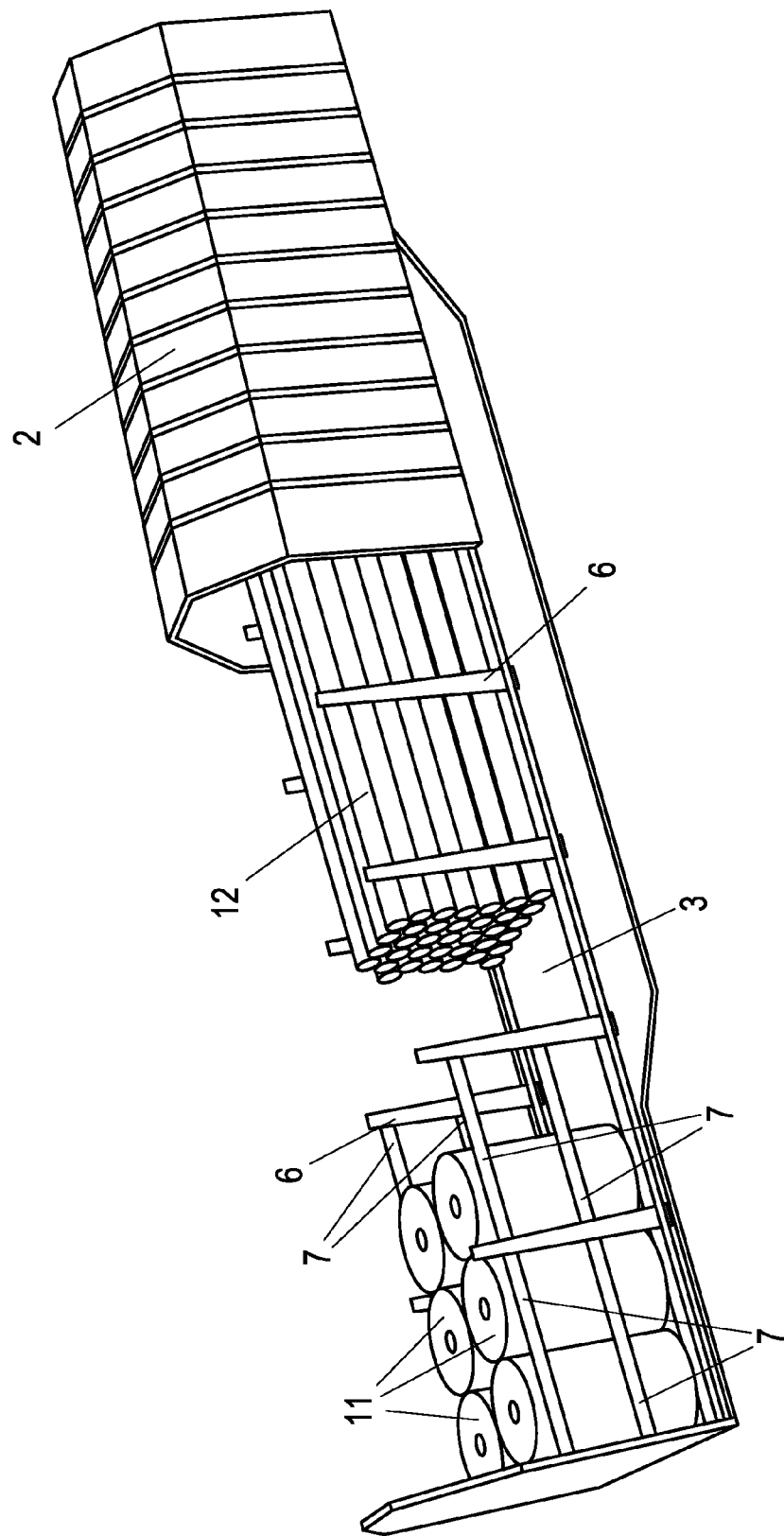
FIG. 3 shows a freight car according to the invention without a chassis and without further details with paper rolls and long timber.

FIG. 3 shows an exemplary embodiment of a freight car 1 in which six paper rolls 11 are arranged at one end (to the left in FIG. 3) on the loading area 3 and long timber 12 in the form of round timber is arranged on the remaining loading area 3. The tensioning belts 10 and other load-securing means are not depicted in FIG. 3.

Figure 4:
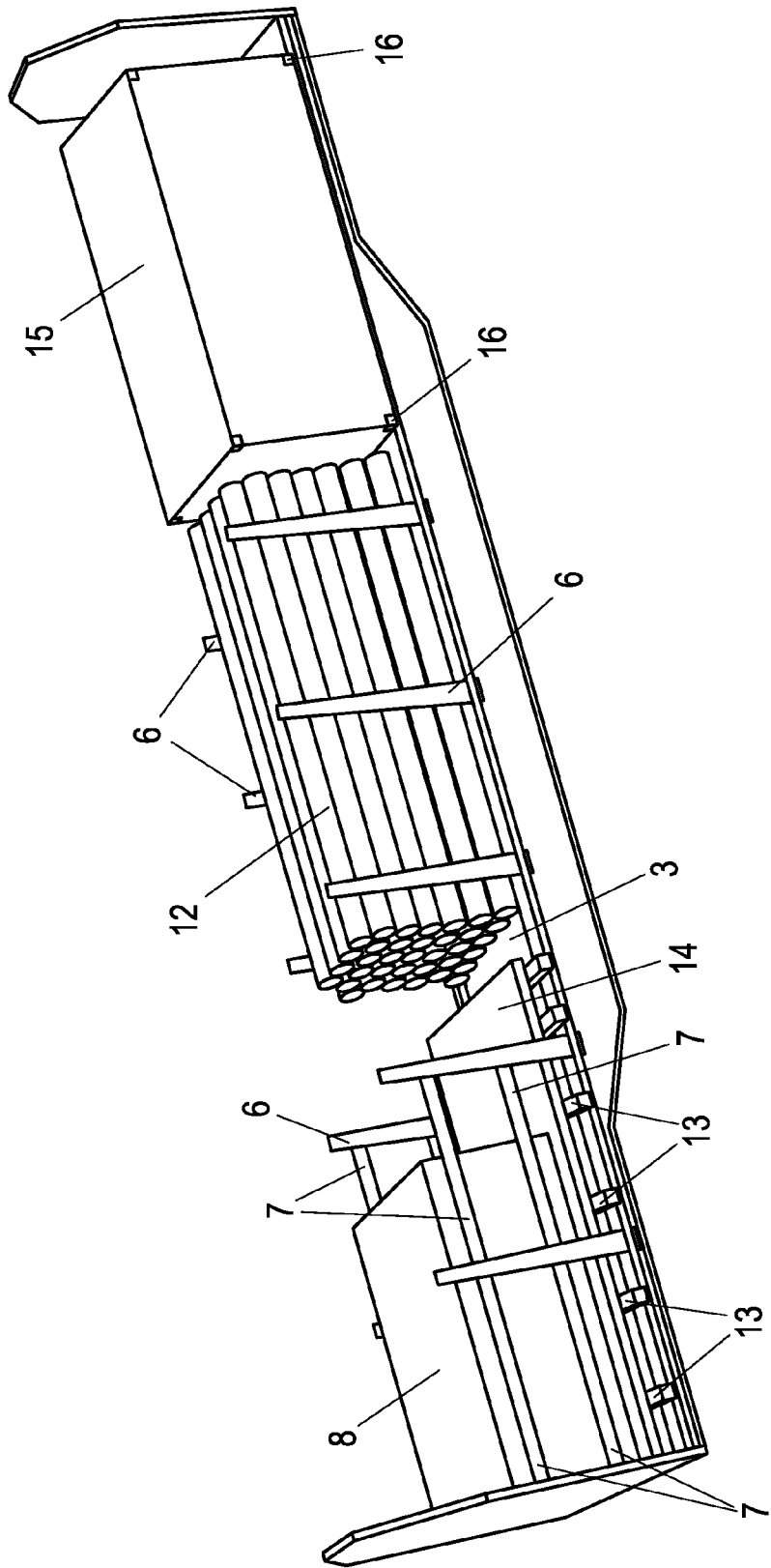
FIG. 4 shows a freight car according to the invention without a chassis and without further details laden with pallets of long timber and a container.
Figure 8:
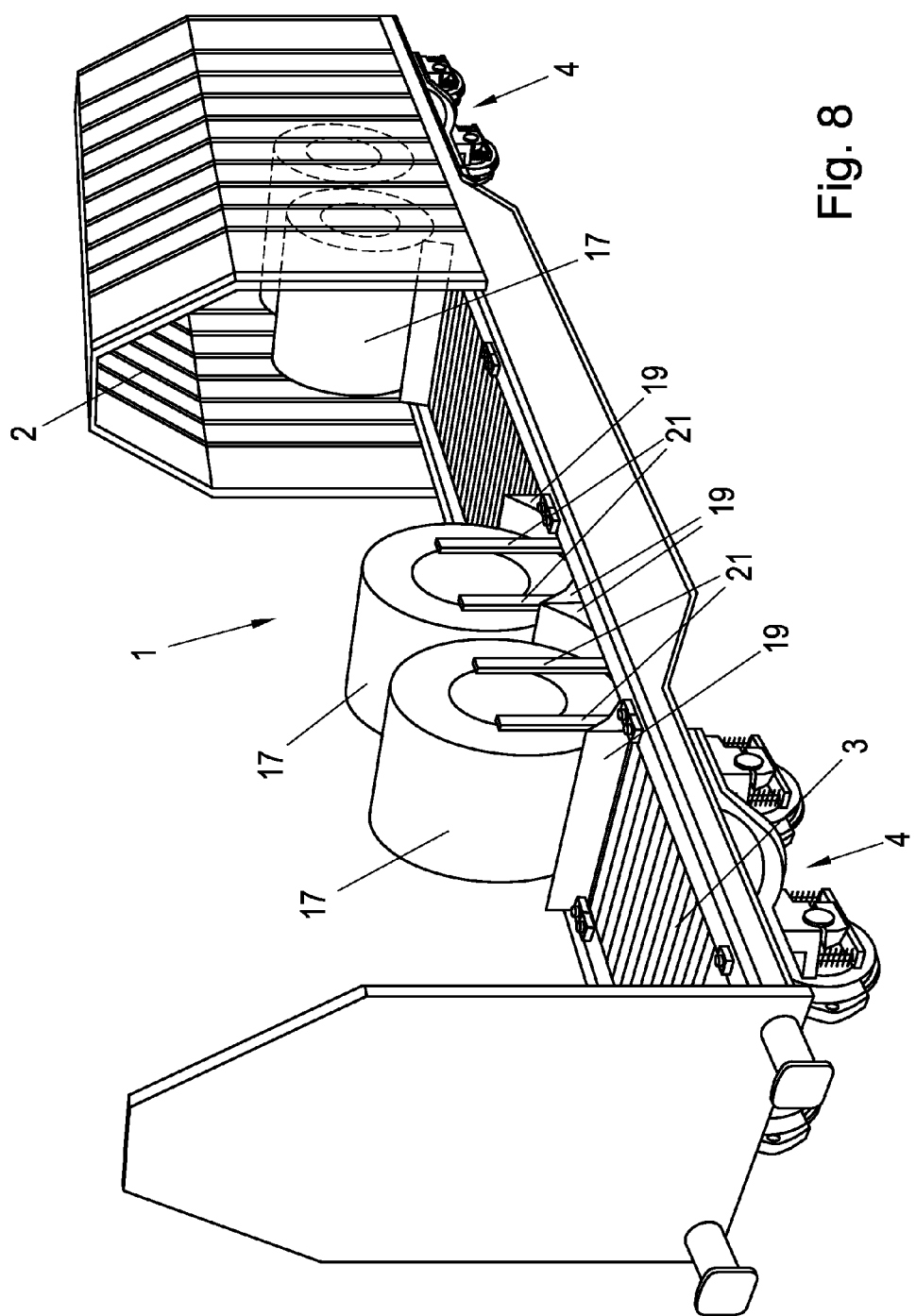
FIG. 8 shows a freight car according to the invention laden with steel coils in coils troughs, FIG. 9 partially shows a freight car according to the invention laden with two steel coils.
Figure 9:
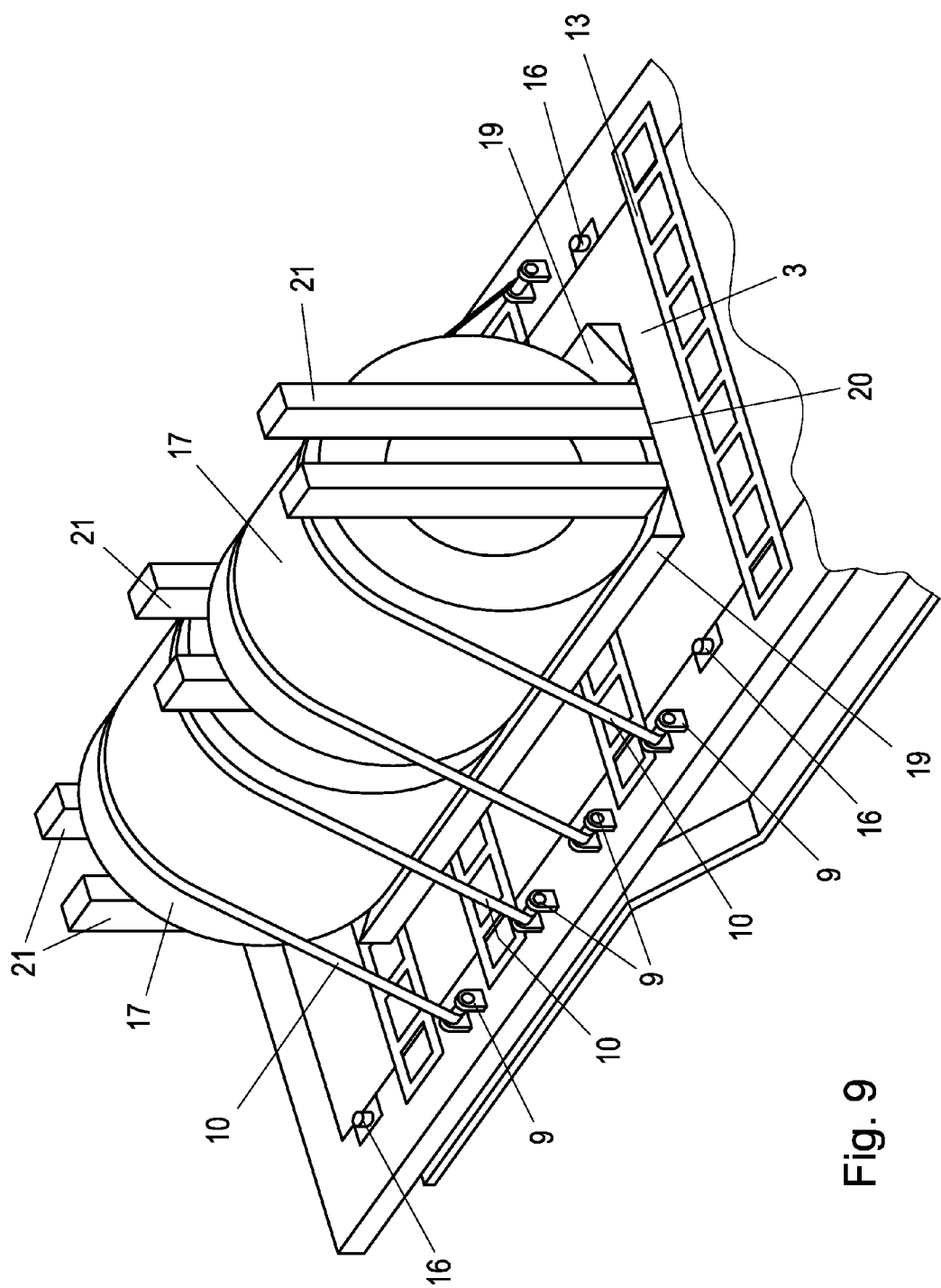

FIG. 4 shows another possibility for loading a freight car 1 according to the invention. Hence, an arrangement of pallets 8 is provided from left to right in FIG. 4 on load restraints 13 and a board 14 laid on these. Long timber 12 (round timber) is further stacked (in the longitudinal center), which is arranged between stakes 6. At the other end of the freight car 1 a container 15 is positioned. In order to secure the container 15, container corners 16 (container lugs) are provided, which are designed so as to be retractable in the loading area 3 and are shown in FIG. 7, 8 or 9, for example.

Figure 5:
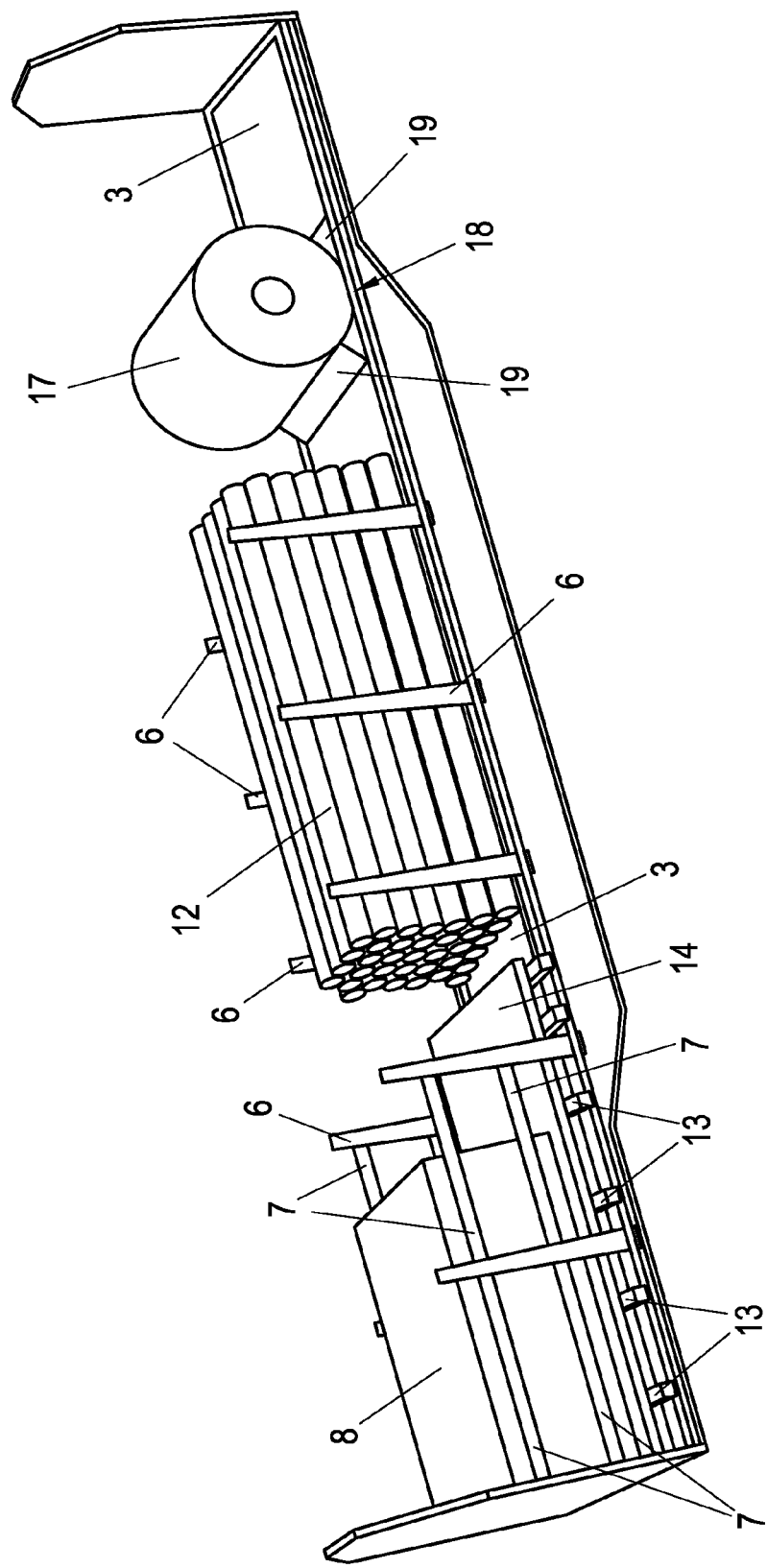
FIG. 5 shows a freight car according to the invention without a chassis and further details laden with pallets of long timber and a steel coil.

In the application according to FIG. 5, a steel coil 17 is provided in a coil trough 18 instead of the container 15 provided in FIG. 4. The coil trough 18 is aligned transversely to the direction of travel in the example in FIG. 5, in other words transversely to the longitudinal extension of the loading area 3 of the freight car 1, and is supplemented by wedges 19 to the front and back in the direction of travel.

Figure 6:
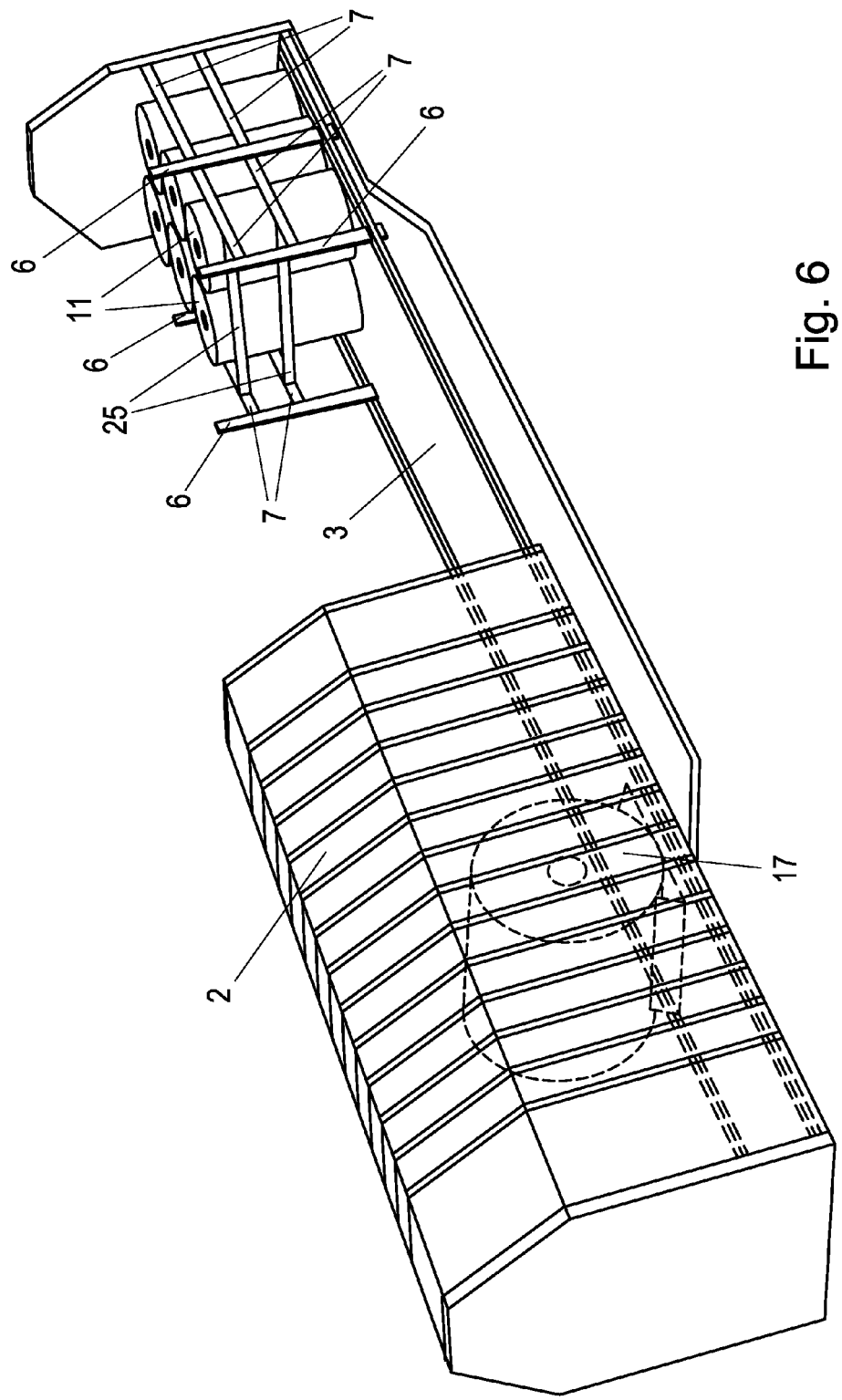
FIG. 6 shows a freight car according to the invention without a chassis laden with a steel coil and paper rolls.

FIG. 6 shows that using the freight car 1 according to the invention, alongside roles of paper 11, which are arranged at one end of the freight car 1 or the loading area 3 thereof, a steel coil 17 can be transported in a coil trough 18. The paper rolls 11 are secured by stakes 6, battens 7 and cross-pieces 25.

Figure 7:
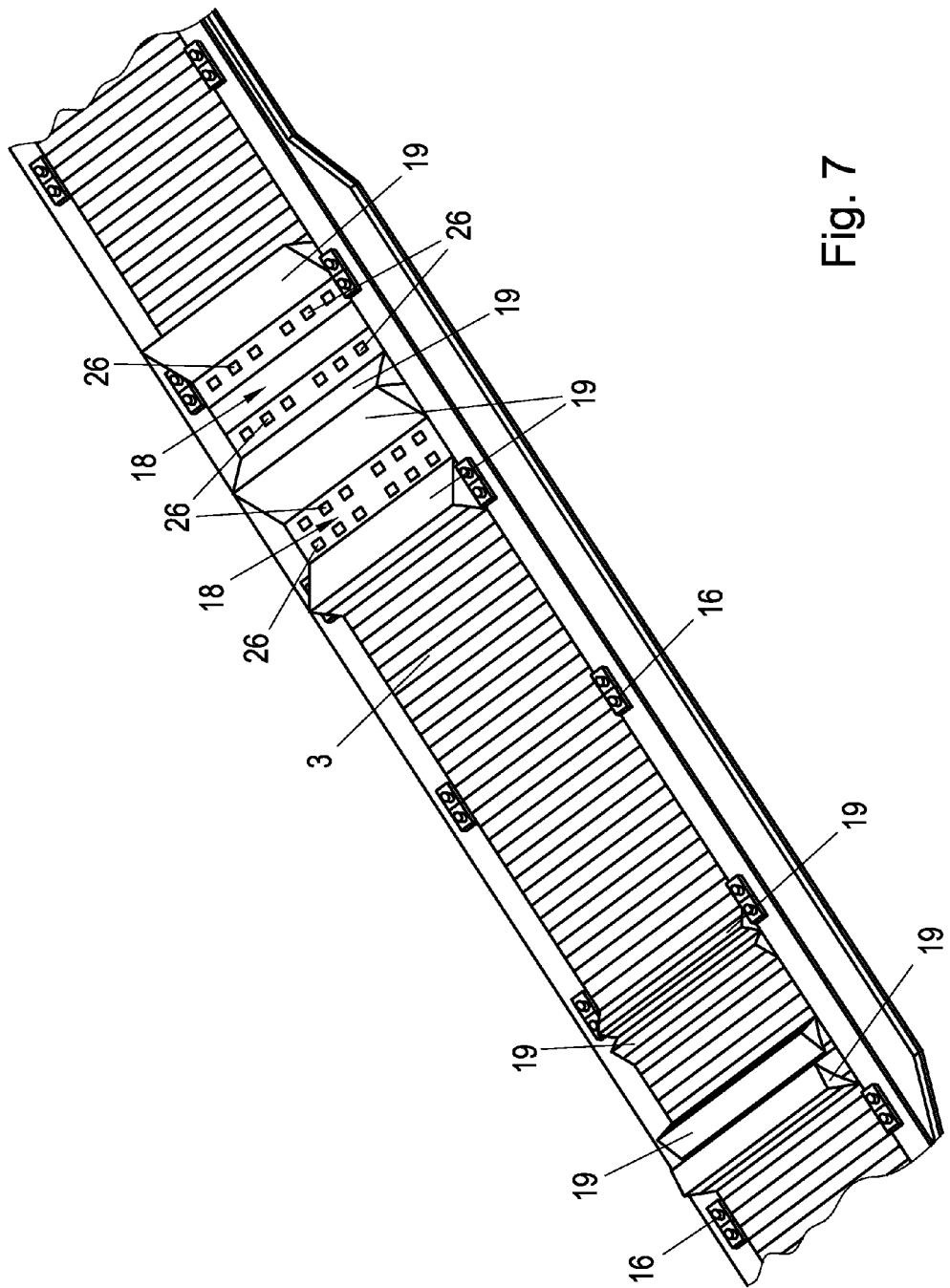
FIG. 7 shows a detail of the loading area with side limits which can be folded down of coil troughs provided in the loading area.

FIG. 7 shows how the wedges 19 on either side of the coil troughs 18 are designed so that they can be folded down in a space-saving manner when a coil trough 18 is not in use, such that they form a trough cover, thereby producing an uninterrupted loading area 3.

FIG. 7 shows the container corners 16 for containers 15, which can be designed to be retractable into the loading area 3 and liftable therefrom.

FIG. 8 shows an example of how four steel coils 17 can be transported in coil troughs 18 on a freight car 1 according to the invention, for which purpose the wedges 19 on either side of the coil troughs 18 can be folded up from the loading area 3 into their position of use.

In order to secure the coils 17 in a transverse direction to the longitudinal extension of the freight car 1 (cf. FIG. 8), insertion stakes 21 are inserted in insertion openings 26 (cf. FIG. 8). Since a plurality of insertion openings 26 are provided alongside one another transversely to the longitudinal extension of the freight car 1 (cf. FIG. 7), the spacing of the insertion stakes 21 can be adapted to the length of the coils 17.

FIG. 9 shows that coil troughs 18 of the freight car 1 according to the invention can not only be aligned transversely to the longitudinal extension of the freight car 1 or the loading area 3 thereof, but also parallel to the longitudinal extension of the freight car 1.

FIG. 9 also shows that stake pockets 20 (insertion openings) are provided in the region of the coil troughs 18, in which insertion stakes 21 for additional load securing of the steel coils 17 can be inserted. The insertion stakes 21 are accommodated in the coil troughs 18 when not in use and the wedges 19 on both sides of the coil troughs 18 are folded down into their out-of-use position, so that an uninterrupted level loading surface 3 is produced.

In this variant too, a plurality of insertion openings 20 are provided alongside one another, so that the insertion stakes 21 (uprights) can be arranged spaced apart from one another so as to correspond to the length of the steel coil 17. The insertion stakes 21 provided between the steel coils 17 are not necessarily required, particularly when the steel coils 17 lie directly against one another, in other words abutting one another, in the coil trough 18.

FIG. 9 also shows that the steel coil 17 can be additionally secured by tensioning belts 10, which are fixed to lashing devices 9.

FIG. 9 also shows that upwardly projecting container corners 16 are provided on the loading area 3 in the position of use, said container corners being intended for use in conjunction with containers 15 to secure the loads thereof.

FIG. 9 further shows that load restraints 13 which can be folded in and out are provided in the loading area 3 of the freight car according to the invention, said load restraints being depicted in FIG. 9 in the (folded-in) out-of-use position, and the (folded-out) position of use thereof, in which they project upwards above the loading area 3, being shown in FIGS. 4 and 5, for example.

Figure 10:
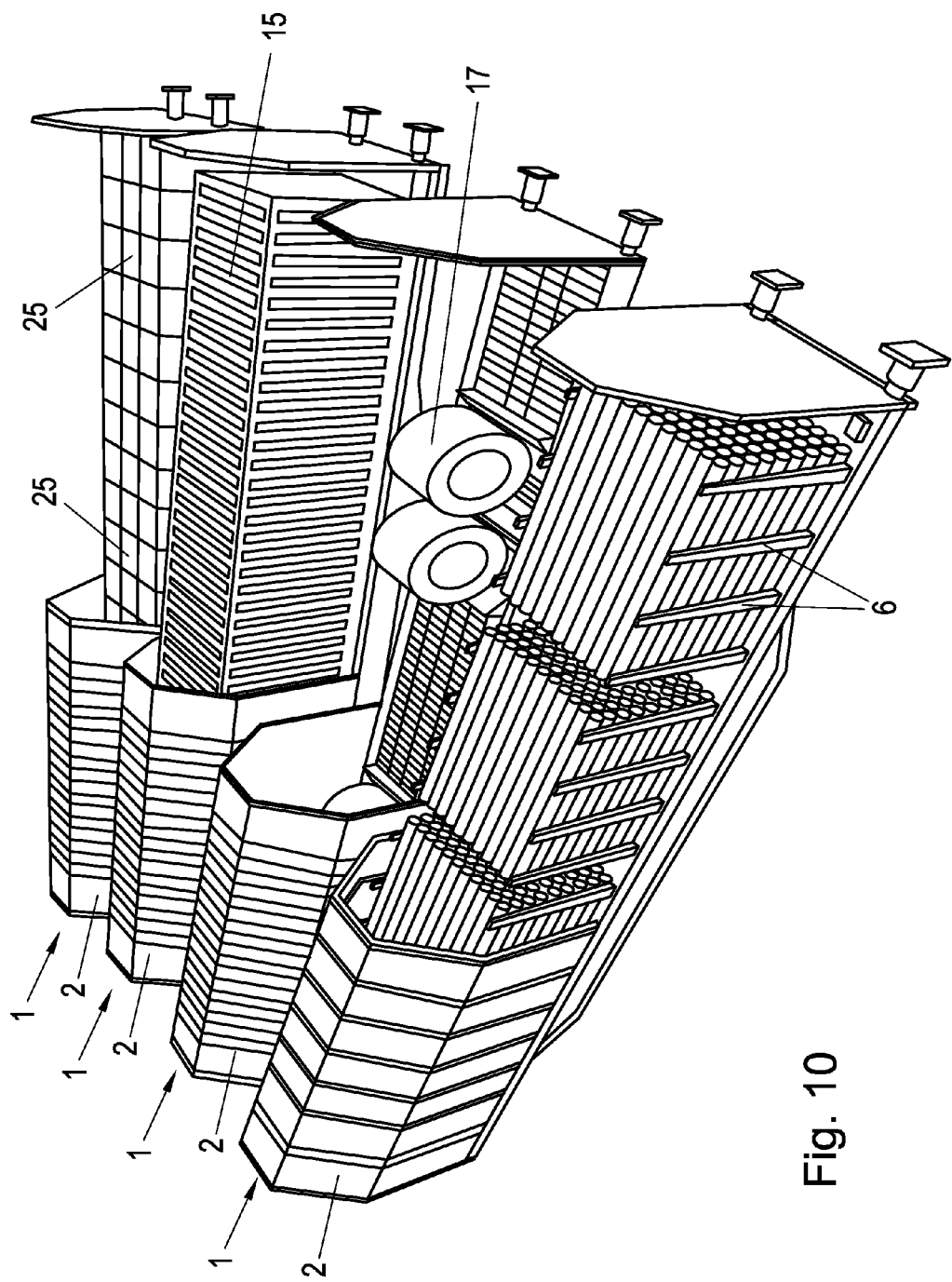
FIG. 10 shows four different possibilities for equipping a freight car according to the invention.

FIG. 10 shows a plurality of embodiments of freight cars 1 according to the invention. The foremost freight car 1 is equipped with covers 2 and laden with round timber, which is arranged between stakes 6. The next freight car 1 is laden with steel coils 17 in a similar fashion to the freight car 1 in FIG. 8. A freight car 1 is provided next to this which is laden with a (long) container 15. The freight car 1 shown right at the back in FIG. 10 is laden with a plurality of boxes of packaged goods 25.

It is self-evident that the covers 2 shown in the open position in FIGS. 1 to 3, 6, 8 and 10 can be moved into a position of use covering the entire freight car 1 (in a watertight manner).

To summarize, an exemplary embodiment of the invention can be described as follows:

A freight car 1 having a loading area 3 and a chassis comprising two bogies 4 has at least one coil trough 18 for steel coils 17 in the loading area 3, wherein the coil trough 18 is allocated with insertion openings 20 for insertion stakes 21. Wedges 19 which can be folded down into the loading area 3 are provided alongside the coil trough 18, so that the coil troughs 18 can be closed by folding down the wedges 19 to form a level loading area 3. Slots 5 for stakes 6 to be inserted along the longitudinal sides of the freight car 1 are further provided in the loading area 3. Container corners 16 are further provided distributed over the loading area 3, so that containers 15 can be secured to the loading area 3. Lashing devices 9 are also provided in a retractable manner in the loading area 3, with which lashing devices tensioning straps 10 can be tightened to secure the load which is positioned on the loading area 3.

The invention claimed is:

1. A freight car, comprising:
   a loading area and at least two axles upon which said loading area is supported;
   said loading area having formed therein one or a plurality of coil troughs for steel coils;
   said loading area having formed therein insertion openings for insertion stakes in a vicinity of said coil troughs for the steel coils;
   trough covers for covering said coil troughs to form a continuous loading surface when said coil troughs are covered by said trough covers.

2. The freight car according to claim 1, formed as a railroad freight car comprising at least four axles mounted on two bogies.

3. The freight car according to claim 1, which comprises parts for securing the steel coils disposed alongside said coil troughs.

4. The freight car according to claim 3, wherein said parts disposed alongside said coil troughs are wedges having a substantially triangular cross section.

5. The freight car according to claim 4, wherein said wedges are detachably or foldably connected to said loading area, and said wedges are disposed in said coil trough when not in use and said coil trough is closed by said trough cover.

6. The freight car according to claim 1, wherein said loading area is formed with container corners for differently sized containers.

7. The freight car according to claim 1, wherein insertion openings for stakes are distributed along longitudinal side edges of said loading area.

8. The freight car according to claim 7, which comprises stakes inserted in said insertion openings and holding devices for battens provided on said stakes and extending parallel to a longitudinal extent of the freight car.

9. The freight car according to claim 8, wherein holding devices for longitudinally extending battens are provided at different heights on the stakes, namely with a different spacing from the loading area.

10. The freight car according to claim 1, wherein eight slots for stakes distributed over a length of said loading area on each longitudinal side thereof or eight rows of groups of slots formed on each longitudinal side of said loading area.

11. The freight car according to claim 1, which comprises lashing devices distributed over the longitudinal sides of said loading area.

12. The freight car according to claim 11, wherein at least two said lashing devices are provided in each case in rows aligned transversely to a longitudinal extent of said loading area.

13. The freight car according to claim 1, wherein the freight car is configured as a covered sliding wall car.

14. The freight car according to claim 1, which comprises load restraints inserted in said loading area and configured to be folded down therein.

15. The freight car according to claim 14, wherein said load restraints are aligned transversely to a longitudinal extent of said loading area.

16. The freight car according to claim 1, which comprises container corners for receiving containers retractably formed in a floor of said loading area.

17. The freight car according to claim 1, which further comprises:
   parts for securing the steel coils disposed alongside said one or plurality of coil troughs, said parts being wedges having a substantially triangular cross section;
   said wedges being foldably connected to said loading area, wherein said wedges are disposed in said coil trough when not in use and wherein said coil trough is closed by said wedges when said wedges are folded down into said coil trough.

* * * * *